US006449615B1

(12) United States Patent
Liu et al.

(10) Patent No.: US 6,449,615 B1
(45) Date of Patent: Sep. 10, 2002

(54) METHOD AND SYSTEM FOR MAINTAINING THE INTEGRITY OF LINKS IN A COMPUTER NETWORK

(75) Inventors: Chao-Chia Liu, Bellevue; Michael J. Hillberg, Kirkland; William P. Morel; James W. Kelly, both of Redmond; Clifford P. Van Dyke, Bellevue, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/157,880

(22) Filed: Sep. 21, 1998

(51) Int. Cl.⁷ .............................................. G06F 17/06
(52) U.S. Cl. ........................ 707/10; 709/200; 709/217; 709/220
(58) Field of Search ............... 707/1–206; 709/100–253

(56) References Cited

U.S. PATENT DOCUMENTS

| | | | | |
|---|---|---|---|---|
| 5,721,919 | A | 2/1998 | Morel et al. | 707/203 |
| 6,230,212 | B1 * | 5/2001 | Morel et al. | 707/200 |
| 6,263,348 | B1 * | 7/2001 | Kathrow et al. | 707/203 |
| 6,263,350 | B1 * | 7/2001 | Wollrath et al. | 707/206 |
| 6,275,857 | B1 * | 8/2001 | McCartney | 707/205 |

OTHER PUBLICATIONS

Qulici et al., "DECODE: a cooperative environment for reverse–engineering legacy software", Rerverse Engineering, 1995, Proceedings of 2nd Working Conference on, 1995, pp. 156–165.*

Fanti et al., An overview of the Data Flow system for the NA48 experiment at CERN, Nuclear Science Symposium and Medical Imaging Conference, 1994, 1994 IEEE Conference Record, vol. 2, 1995, pp. 623–626, vol. 2.*

Division of Academic Computing of Northeastern University. "Allocating RAM to an Application"—[web page] Aug. 9, 1995. http://www.dac.neu.edu/TheGuide/Macintosh/Basics/Advanced Topics.html. [Accessed Aug. 11, 1998].

Division of Academic Computing of Northeastern University. "Chapter 4—Alias Manager"—[web page]. http://www.dac.neu.edu/TheGuide/Macintosh/Basics/AdvancedTopics.html. [Accessed Aug. 11, 1998].

Division of Academic Computing of Northeastern University. "Search Strategies"—[web page]. http://www.dac.neu.edu/TheGuide/Macintosh/Basics/AdvancedTopics.html. [Accessed Aug. 11, 1998].

Division of Academic Computing of Northeastern University. "Resolving Alias Records"—[web page]. http://www.dac.neu.edu/TheGuide/Macintosh/Basics/AdvancedTopics.html. [Accessed Aug. 11, 1998].

* cited by examiner

Primary Examiner—Thomas Black
Assistant Examiner—David Jung
(74) Attorney, Agent, or Firm—Leydig, Voit & Mayer, Ltd.

(57) ABSTRACT

A method and system for maintaining the integrity of links in a computer network. The method and system is realized in a link tracking service including a local link tracking service, preferably running on all of the computers within the network, and a centralized link tracking server, preferably running on a network server. The local link tracking service manages the link tracking activities for the machine on which it resides. These activities include searching for link sources and tracking link source moves. The centralized link tracking service is provided to cooperate with the local link tracking services and, more particularly, for recording link source file movements as reported to it by the local link tracking services. The recorded information is available to be used by the local link tracking services should the local link tracking services need assistance in finding a link source that has been moved.

76 Claims, 11 Drawing Sheets

FIG. 6

```
***** Dump of link file (Shortcut to Word.doc.lnk) *****

[Shell Link Data (sld)]
    cbSize           = 0x0000004C
    SUID             = {00021401-0000-0000-C000-000000000046}
    dwFlags          = 0x0000009B
                       SLDF_HAS_ID_LIST, SLDF_HAS_LINK_INFO, SLDF_HAS_RELPATH, SLDF_HAS_WORKINGDIR, SLDF_HAS_UNICODE
    dwFileAttributes = 0x00000620
                       FILE_ATTRIBUTE_ARCHIVE    is set.
    ftCreationTime   = 15:09:50, 08/11/1998
    ftLastAccessTime = 15:10:34, 08/11/1998
    ftLastWriteTime  = 18:38:11, 08/04/1998
    nFileSizeLow     = 31744 bytes
    iIcon            = 0
    wHotkey          = 0x080
    dwRes1           = 0x080
    dwRes2           = 0x080
[Strings]
    pszRelPath       = (UNICODE) .\Word.doc
    pszWorkingDir    = (UNICODE) C:\Tracking
```

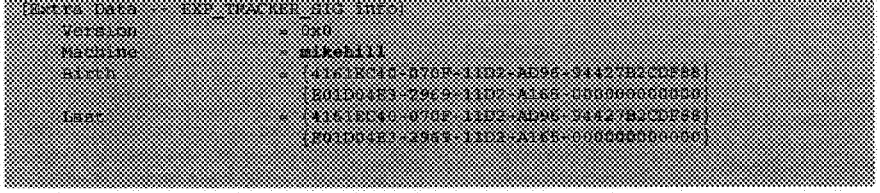

FIG. 7

```
===== Dump of link file (Shortcut to Word.doc.lnk) =====

[Shell Link Data (sld)]
    cbSize          = 0x0000004C
    GUID            = {00021401-0000-0000-C000-000000000046}
    dwFlags         = 0x00000093
                      SLDF_HAS_ID_LIST, SLDF_HAS_LINK_INFO, SLDF_HAS_WORKINGDIR, SLDF_HAS_UNICODE
    dwFileAttributes = 0x00000820
                      FILE_ATTRIBUTE_ARCHIVE    is set.
                      FILE_ATTRIBUTE_COMPRESSED is set.
    ftCreationTime  = 15:42:58, 08/11/1998
    ftLastAccessTime = 15:42:58, 08/11/1998
    ftLastWriteTime = 18:38:11, 08/04/1998
    nFileSizeLow    = 31744 bytes
    iIcon           = 0
    wHotkey         = 0x980
    dwRes1          = 0x080
    dwRes2          = 0x080

[Strings]
    pszWorkingDir   = (UNICODE) \\Scratch\scratch\mikehill

[Extra Data -- EXP_TRACKER_SIG_INFO]
    Version         = 0x0
    Machine         = scratch
    Birth           = {4161BC40-070F-11D2-AD96-84427B2CDF88}
                      {201D04E1-29E9-11D2-A165-000000000000}
    Last            = {DFC9EF6A-FB81-11D1-898B-804191461946}
                      {D600A05C-2FA3-11D2-888D-000000000000}
```

METHOD AND SYSTEM FOR MAINTAINING THE INTEGRITY OF LINKS IN A COMPUTER NETWORK

FIELD OF THE INVENTION

This invention relates generally to computer network link tracking services and, more particularly, relates to a method and system for maintaining the integrity of references to a link source.

BACKGROUND OF THE INVENTION

It is known in the art to represent a link source, e.g., a computer file, through the use of a link client. By way of example, the "MAC OS" brand operating system provides a mechanism for representing a link source using a link client. This is referred to as providing an alias to the link source. Similarly, the "WINDOWS 95" and "WINDOWS NT" 4.0 brand operating systems provide a mechanism for representing a link source using a link client. This is referred to as providing a shell shortcut to the link source.

For use in representing the link source, the link client generally includes data structures that describe a path to the link source as well as other information indicative of certain characteristics of the link source. When the link client is activated, such as by being double clicked, the path directs the computer to the link source whereby the link source may be acted upon, for example, by being opened. The information indicative of certain characteristics of the link source is particularly useful for locating a link source that has been moved, i.e., the path no longer points to the link source.

For finding a link source that has been moved, both the "MAC OS" and the "WINDOWS 95" and "WINDOWS NT" 4.0 brand operating systems include a link tracking service. The link tracking service contains algorithms for locating link sources that have been moved, renamed, copied, or restored from backup. Generally, these algorithms attempt to find a file that has substantially the same characteristics as the link source as represented by the link source descriptors contained within the link client.

More specifically, within the "MAC OS" brand operating system, the link tracking service includes two searching algorithms, namely, a relative search algorithm and an absolute search algorithm. In performing a relative search, the link tracking service starts in a specified directory and searches for the target of an alias record (using the file ID, directory ID and/or file name descriptors) by ascending the file system hierarchy to a predetermined common parent of the target and the starting directory. If the client source was not found during this ascending search, the link tracking service continues the search for the client source by descending the hierarchy from that common parent. In performing an absolute search, the link tracking service starts at the root directory of the file system hierarchy and descends the hierarchy looking for the client source using substantially the same search criteria.

Within the "WINDOW 95" and "WINDOWS NT" 4.0 brand operating system, the link tracking service includes a similar tree searching algorithm to find a likely match for the link source represented by the link client. This search algorithm performs the search utilizing the last known path of the link source file as well as the link source descriptors contained within the link client (e.g., the creation date, the file size, and the file name and extension of the link source). Within the "WINDOWS NT" 4.0 brand operating system, the searching algorithm also performs the following steps (subject to time limits imposed by the client application):

1. It searches four directory levels down from the last directory.

2. It moves up one directory and repeats steps 1 and 2 another three times (which can yield results if the target object has been moved near the original path).

3. It searches four levels down from the desktop root (which can yield results if the target object has been moved to a new location on the same desktop).

4. It searches four levels down from the root on each local fixed drive and repeats steps 1–3 within the four directory limit.

It is noted that the "UNIX" brand operating system also provides a mechanism for representing a link source using a link client that is referred to as providing a symbolic link. A symbolic link is a link client that only maintains a path to the link source. However, no link tracking capabilities are provided.

In addition to the specific link source searching algorithms described above, there are various other link source tracking approaches known in the art. As will be appreciated, these link source tracking approaches are currently used to resolve links on local area networks and/or on wide area networks such as the Internet. These approaches are generally categorized as follows:

1) Back Links—In this approach the link source maintains a set of links to all of its link clients. When a link source is moved, the back links are traversed and the link clients have their forward links updated. When a link client is duplicated, the link source is updated to add the new back link.

2) Distributed Tombstones—In this approach, when a link source is moved, a tombstone is left in its place. The tombstone identifies the location to which the link source has been moved. When a link client discovers a missing link source, it uses the tombstone to begin the search for the link source. If the link source has moved multiple times, the link client may have to take multiple hops to find the final location of the link source. When this occurs, the link client may update all of the intermediate tombstones to refer to the final location so that other link clients can find the link source in one step.

3) Level of Indirection—In this approach all link sources are catalogued in a globally available server. Link clients store the index within the server of their link source. Every traversal of the link to the link source goes through the server. This method may be optimized by also storing the last known location of the link source in the link client. In this manner, the link client need only consult the link server after a link source has been moved.

4) Search Lists—In this approach no action is taken when a link source is moved. However, when a link client fails to find the link source at the expected location, all machines on a list are searched to find the location of the moved link source. The search list can be maintained manually or automatically.

While these various approaches to link management generally work for their intended purpose, they have several disadvantages associated with their use that are apparent from the brief descriptions provided. For example, the described searching algorithms have the disadvantage of not always yielding positive results when used to perform a link source search. This is particularly true if the link source has been moved to a different machine. Furthermore, these searching algorithms have the disadvantage of using a relatively large amount of network CPU time. In addition, these searching algorithms tend to tie up the machine to the frustration of the user. Still further, these algorithms tend to be difficult to secure as they fail to provide security measures that restrict malicious users from redirecting link clients to dangerous link sources. Accordingly, there exists a need for an improved method and system for maintaining the integrity of references to a link source.

SUMMARY OF THE INVENTION

In accordance with this need, the invention is generally realized in a link tracking service for use in maintaining a link between a link client and a link source. The link tracking service includes a local link tracking service, preferably running on all of the computers within a network, and a centralized link tracking service, preferably running on a network server. The local link tracking service manages the link tracking activities for the machine on which it resides. These activities typically include searching for link sources and tracking link source moves. The centralized link tracking service is provided to cooperate with the local link tracking services and, more particularly, for recording link source file movements as reported to it by the local link tracking services. The recorded data is available to the local link tracking services for use in finding a link source that has been moved and for updating data contained within the link client.

Additional features, advantages and objects of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 6 is a data structure generally illustrating a link client file in accordance with the invention;

FIG. 7 is a further representation of the link client file illustrated in FIG. 6;

DETAILED DESCRIPTION OF THE INVENTION

Figure 1:
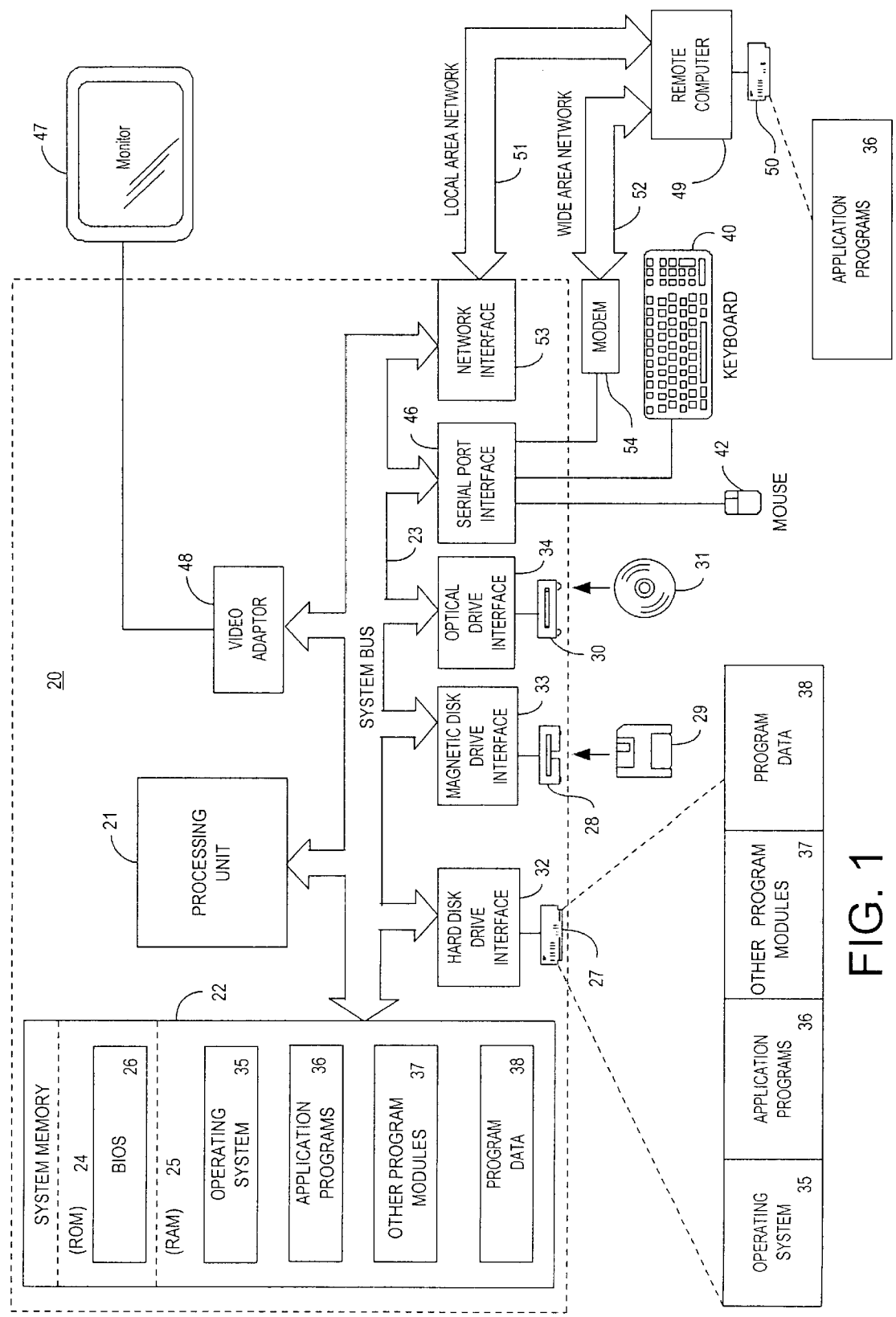
FIG. 1 is a block diagram generally illustrating an exemplary computer system on which the present invention resides.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the person computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
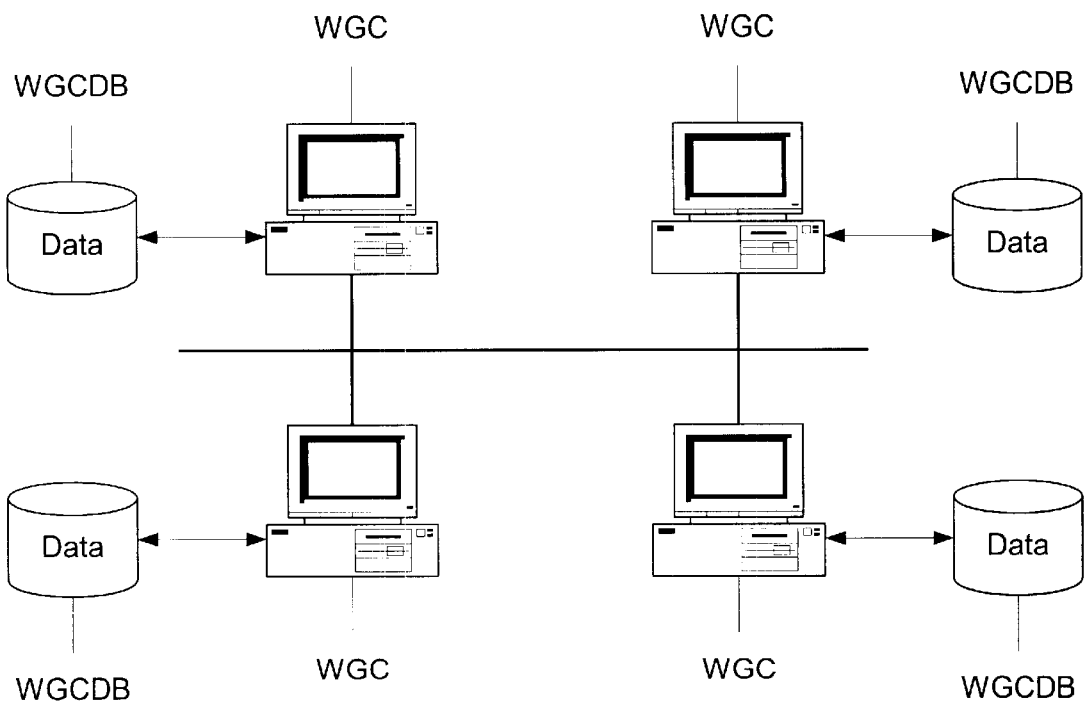
FIG. 2 is a block diagram generally illustrating an exemplary work group on which the present invention may reside.

The exemplary network within which the computer system 20 resides may be configured to include one or more work groups and/or domains. A work group, illustrated in FIG. 2, is simply an organizational unit, a way to group computers in a network that do not belong to a domain. In a work group, each computer WGC keeps track of its own user and group account information in an associated database WGCDB and does not share this information with other computers. Each computer WGC that participates in a work group maintains its own security policy and security account databases.

Figure 3:
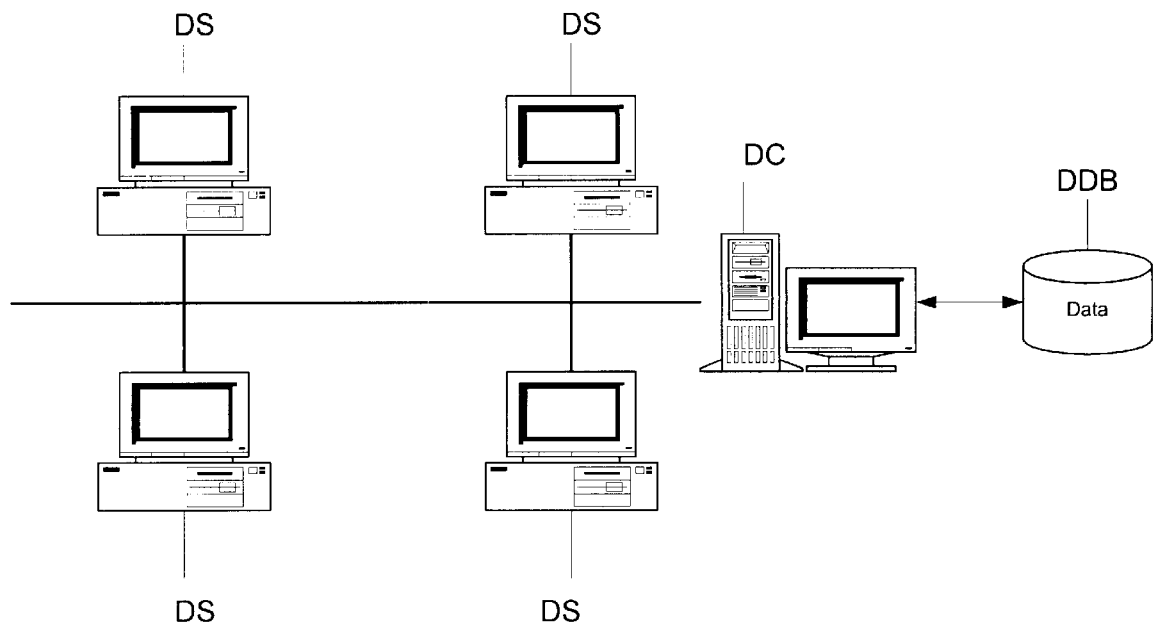
FIG. 3 is a block diagram generally illustrating an exemplary domain on which the present invention may reside.

A domain, illustrated in FIG. 3, is a group of networked computers/servers DS that share common security policies and user account databases DDB. One domain server, which may be for example computer 49 in FIG. 1, acts as the domain controller (DC) and functions to maintain the centralized security databases for the domain. Users within the domain are authenticated by the DC.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

In accordance with the invention, the computers 20 and 49 include instructions for allowing a link client to be used as a reference to a link source. Generally, the link client provides a fast way to perform an action on the link source, such as opening a file, document, Web page, etc. To allow ease of access to the link client by a user of the computer, the link client is usually represented by an icon or the like within a folder, menu or on the desktop of the computer. As will be appreciated, a link client may also be a file that contains embedded pointers to a linked object through the use of, for example, OLE. As an example of this latter use of link clients, the reader is referred to commonly owned U.S. Pat. No. 5,721,919 entitled "Method And System For The Link Tracking Of Objects" to Morel et al. which is incorporated herein by reference in its entirety.

Figure 4:
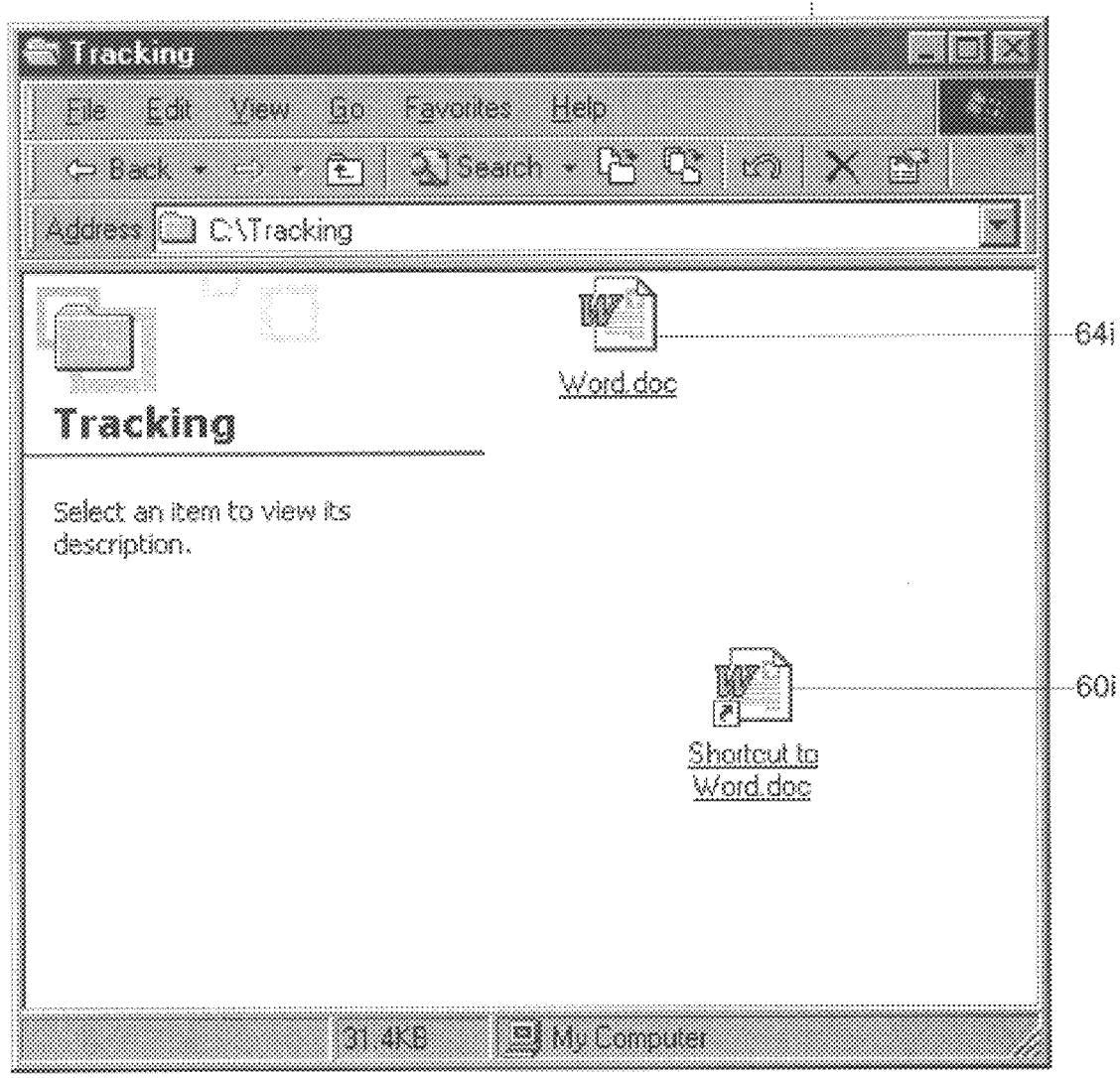
FIG. 4 is a screen shot illustrating an exemplary means by which a link client is exposed to a user.

By way of example only, FIG. 4 illustrates a common use of a link client 60 in the form of a shortcut icon 60I located within a file folder window 62. The link client 60 is used to represent a shortcut to a link source 64, namely, the file represented by the icon 64I. In this manner, the shortcut icon 60I can be activated, such as by being double clicked, to cause the computer 20 to find and open the link source 64 as if the icon 64I was activated directly. This will occur even if the link source 64 is moved from the illustrated folder to a different location within the same volume, a different volume, or a different computer. As will be further appreciated, while the icon 60I will continue to be displayed within the illustrated folder if the link source 64 is moved, the icon 64I will no longer appear therein (the icon 64I will travel with the link source 64 to its new location).

More specifically, the subject invention provides a link tracking service. The link tracking service includes a local link tracking service that preferably runs on all of the computers 20 within the network. The local link tracking service manages the link tracking activities for the machine on which it resides. These activities include searching for link sources and tracking link source moves. The movement of the link source 64 may be accomplished, for example, via the normal MoveFile API, by disconnecting its host volume and moving it to another machine, by renaming the host machine, or by renaming the network share used to access the link source.

The link tracking service may further include a centralized link tracking service that runs on each DC within a domain. The centralized link tracking service is provided to cooperate with the local link tracking services within its domain and, more particularly, for recording link source file movements as reported to it by the local link tracking services. These movements are recorded in a database associated with the centralized link tracking service. This database is available to be queried by the local link tracking services should the local link tracking services need assistance in finding a link source that has been moved.

To allow the link tracking service to perform the noted functions, various IDs are used. Generally, the IDs are as follows:

Machine ID: Identifies a computer in the network.

Volume ID (VolID): Identifies a volume in a machine.

Object ID (OID): Identifies a file system object in a volume.

Link Source ID (LSID): A VolID concatenated with an OID.

Figure 5:
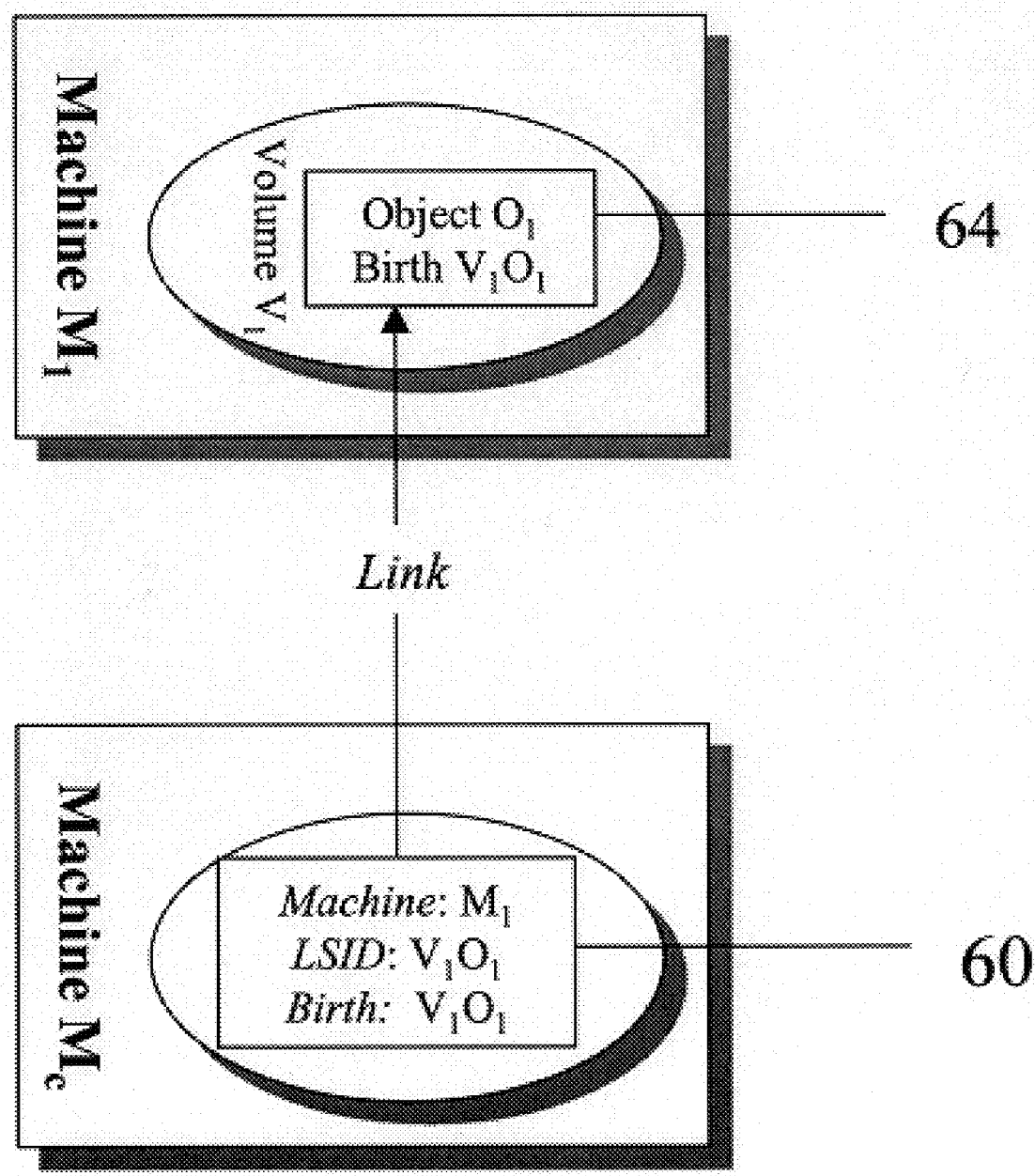
FIG. 5 is a block diagram generally illustrating a connection between a link client and a link source in accordance with the invention.

More specifically, and by way of example with reference to FIG. 5, the IDs that are utilized in the link tracking service are those associated with the link source 64. As illustrated, the file that is the link source 64 is located within a volume having a VolID ($V_1$) that is located on a machine having a machine ID ($M_1$). The machine ID is provided to the machine by the network server, for example the DC, when it is first installed on the network. The manner in which the VolID is provided to the volume will be discussed in greater detail hereinafter with reference to the link tracking procedure of the link tracking service.

As further illustrated in FIG. 5, the link source file includes an OID ($O_1$) and a birth LSID ($V_1O_1$). Typically, the OID and the birth LSID are stored within data fields as part of the header of the file. The OID is provided to the link source file in a known manner by the appropriate operating system services when the file is created or moved between volumes. Preferably, the OID is a "WINDOWS NT" file system (NTFS) version 5.0 or later OID that functions as a GUID. Similarly, the birth LSID is provided to the link source file in a known manner by the appropriate operating system services the first time the file is linked to a link client. The birth LSID is the concatenation of the VolID of the volume on which the file was located and its then OID when the first link was made. The birth LSID associated with the link source 64 will not change even if the link source is moved to a new location.

In the example provided, the current LSID of the link source file is the same as its birth LSID. This indicates that the link source file has not changed volumes since a link to it was established. In the exemplary network environment, when a link source 64 is moved within the same volume neither the OID of the link source file nor the VolID of the volume on which the link source file resides will change as security risks are deemed to be minimal. However, in this environment, when a link source 64 is moved to a new volume (within the same machine or to a new machine within the domain) the current LSID of the link source 64 will change. Specifically, the current LSID will change to reflect the VolID of the new volume on which the link source 64 is stored and the new OID assigned to the link source 64 for that volume. As a link source 64 is moved from volume to volume within the domain, its current LSID continues to change in the manner described.

Turning now to the link client 60, it is seen that the link client includes a plurality of data fields used to describe the link source 64. As illustrated in FIGS. 5–7, these data fields include data fields to hold the machine ID of the last machine on which the link source 64 was known to reside, the birth LSID of the link source 64, and the last LSID of the link source 64. The last LSID contains the VolID and OID of the then current LSID of the link source 64 when the last link was made to it by the link client 60. The LSIDs are maintained in two long number data fields wherein the first data field holds the VolID and the second data field holds the OID. In the link client file illustrated in FIG. 6, as the birth LSID and the last LSID are the same, it is apparent that the link source 64 has not changed volumes between the time the first link was created to it and the last time the link source 64 was called from the link client 60. In the link client file illustrated in FIG. 7, however, as the birth LSID and the last LSID are different, it is apparent that the link source 64 had changed volumes between the first time the link was created to it and the last time the link source 64 was called from the link client 60.

While the foregoing discussion pertains to a single link between a link client and a link source, it will be appreciated that a link source may be linked to more than one link client. Accordingly, when a link client is created, it may not be the first time a link source has been linked to. Thus, when a link client is created, the birth LSID may not match the last LSID within that link client as the link source may have been moved since it was first linked to by another link client.

Figure 8:
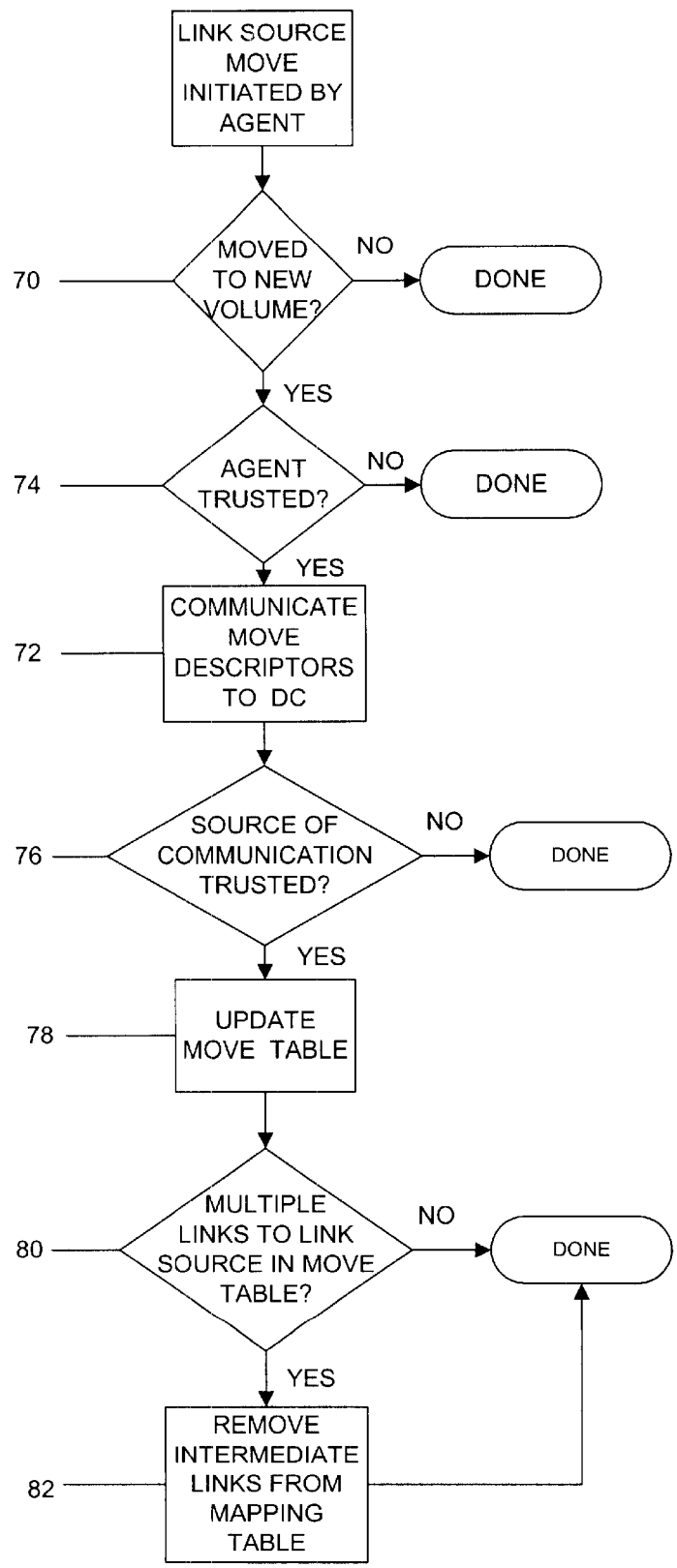
FIG. 8 is a flow chart diagram generally illustrating a method for saving link source movement information in accordance with the invention.
Figure 9:
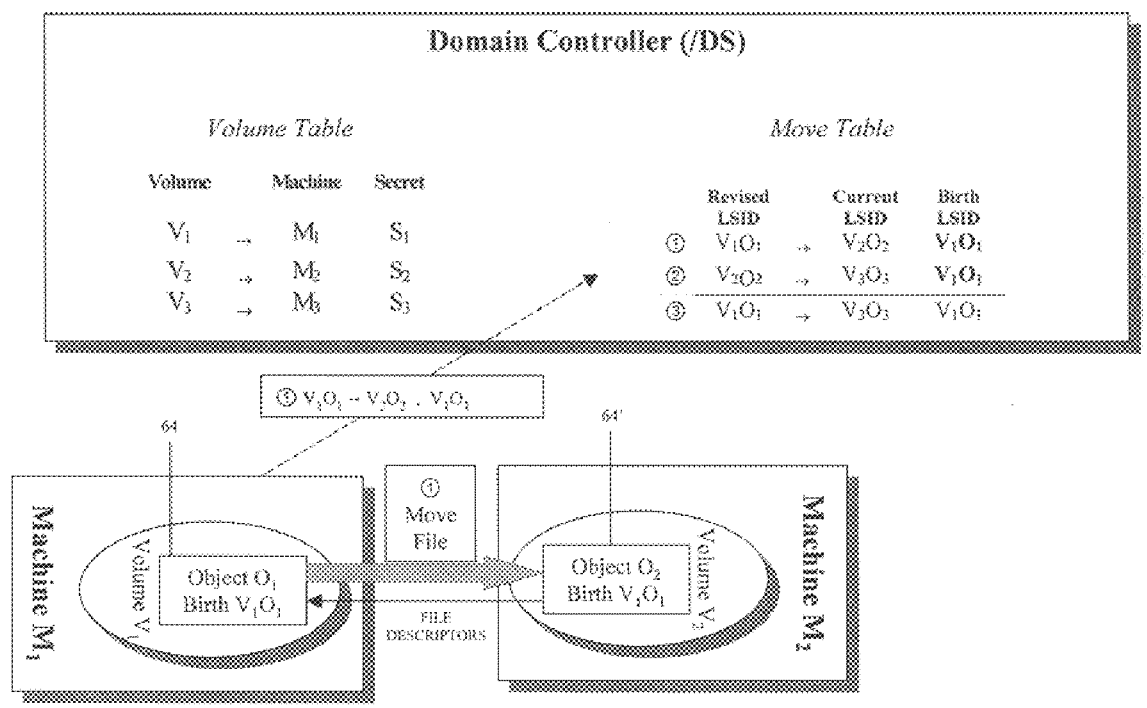
FIG. 9 is a data flow diagram generally illustrating the method for saving link source movement information in accordance with FIG. 8.

For tracking the movement of the link source 64, the local link tracking service resident on the move-source computer (the computer on which the link source 64 is stored prior to the move) is initiated in response to the performance of a file move operation arising from the use of the MoveFile API if, as illustrated in FIGS. 8 and 9, the MoveFile API determines in step 70 that the link source 64 is being moved to a new volume. Additionally, if the link source 64 is being moved to a new volume, the centralized link tracking service resident on the DC is notified of the move in step 72 through the issuance of a message from the local link tracking service. This message, comprising data representative of the move, is forwarded to the DC using an appropriate communication protocol. In the illustrative embodiment, the data included within the message comprises a revised LSID (the LSID associated with the link source file before the move operation), a current LSID (the LSID that will be associated with the link source file after the move operation has been completed) and the birth LSID of the link source file. The issuing of messages to the DC only when the link source is moved to a new volume has the advantage of minimizing network communications traffic as well as minimizing the amount of data required to be maintained by the DC.

To maintain the data representative of the movement of a link source 64 within the DC, the DC includes a pair of database tables, namely, a volume table and a move table, as part of its centralized link tracking service. These table may be clearly seen in FIG. 9. The move table is preferably used to map birth LSIDs and revised LSIDs to current LSIDs.

In the example illustrated in 9, a link source 64 having an OID $O_1$, birth LSID $V_1O_1$ and current LSID $V_1O_1$ residing on machine $M_1$ is to be moved to a new volume $V_2$ residing on machine $M_2$. The moved link source 64' will be provided with a new OID $O_2$ by machine $M_2$ as a consequence of its move to a new volume and, accordingly, will have a new current LSID $V_2O_2$, the old current LSID $V_1O_1$ now being the revised LSID. The new current LSID $V_2O_2$ is communicated back to the local link tracking service on machine $M_1$ and the local link tracking service forwards this data, along with the birth LSID $V_1O_1$ and revised LSID $V_1O_1$ of the link source, to the centralized link tracking service on the DC. As preferred, this communication occurs only as a consequence of the move being a move to a new volume. The centralized link tracking service on the DC then records this data in the appropriate data fields in its move table as illustrated in step 78 of FIG. 8.

For minimizing the amount of data required to be maintained within the move table, the centralized link tracking service may further utilize a table shortening procedure as illustrated in steps 80 and 82 of FIG. 8. Generally, this procedure scans the link list entries within the move table and removes any intermediate links therefrom. By way of example and with further reference to FIG. 9, when the link source 64' is moved from volume $V_2$ to a third volume $V_3$ the move table will be updated in the manner previously described to reflect the revised LSID $V_2O_2$ mapped to the current LSID $V_3O_3$. However, as the same link source (identified by its birth LSID $V_1O_1$) now has two entries in the mapping table wherein the current LSID $V_2O_2$ of the first entry (1) is the same as the revised LSID $V_2O_2$ of the second entry (2), the centralized link tracking service will consolidate the move table entries by creating a third entry (3) using the revised LSID $V_1O_1$ of the first entry and the current LSID $V_3O_3$ of the second entry. Thereafter, the centralized link tracking service will delete both the first and second entries (1) (2) from the move table as they are now superfluous. This shortening of the mapping table entries may be performed in response to the receipt of communications from the local machines and/or at predetermined timed intervals.

To provide a measure of security and to ensure the maintaining of an accurate move table, a further restriction may be imposed before any link source movement data is forwarded to the DC. As illustrated in step 74 of FIG. 8, a check may be made within the local link tracking service to determine if the agent requesting the move is a trusted agent. If the agent is not deemed trustworthy, the local link tracking service will not communicate the move data to the DC, even if such a move is performed. For example, the local link tracking service may check to see if the moving agent has write access to the file. If the moving agent has such access, the agent can be deemed trustworthy and, accordingly, the data representative of the move may be communicated to the DC. In this manner, the described security measure has the advantage of preventing a rogue user from corrupting the move table with a link to an unsavory file such as an executable containing a virus.

Returning to FIG. 9, the volume table within the DC is used to map VolIDs ($V_x$) to the ID of the machine ($M_x$) that currently hosts that volume. In addition to having the appropriate data fields to store the data that links the VolIDs to the machine IDs, each volume table mapping entry may also include a data field for storing the secret ($S_x$) associated with the mapped volume. The manner in which VolIDs and secrets are given to volumes as well as how this information is provided to the volume table will now be described.

Figure 10:
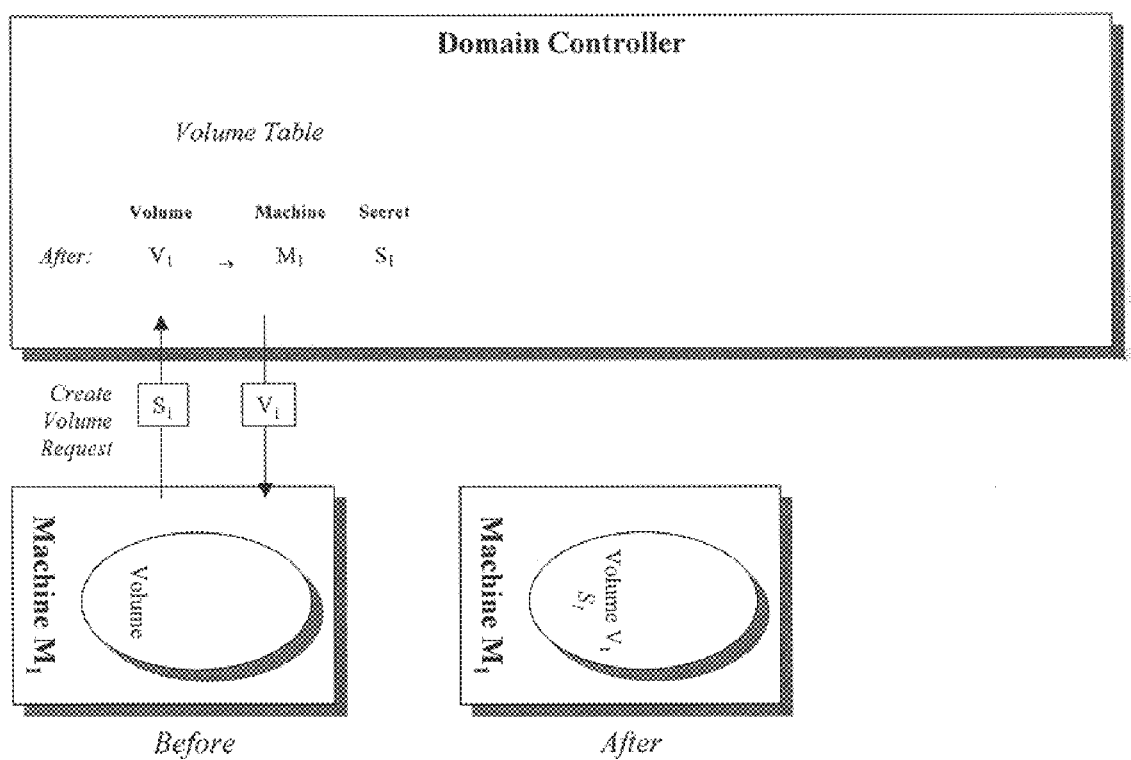
FIG. 10 is a data flow diagram generally illustrating a method for initializing a volume in accordance with the invention.

As will be understood by those of skill in the art and as generally illustrated in FIG. 10, when a volume is installed on a machine the machine checks to see if the volume is new to the machine. Typically, a machine knows if a volume is new to it as the machine ID of the last machine to successfully claim the volume is written on the volume. If the volume is new to the machine and the machine determines that the volume has no VolID stored thereon, the machine will generate a secret that will be stored on the volume. The secret is a randomly generated number, preferably generated as a function of some randomly timed event, for example, disk access times or keystroke time intervals, that may be used to subsequently identify the volume. Thereafter, the machine will call the network services within the DC to request a VolID for that volume while concurrently passing to the DC the secret associated with that volume. In response to its acceptance of the secret ($S_1$ in the illustrated embodiment), the network service will return to machine ($M_1$ in the illustrated embodiment) the requested VolID ($V_1$ in the illustrated embodiment). This data will also be stored in the appropriate data fields within the volume table of the centralized link tracking service.

If the volume is new to the machine and the machine determines that the volume has had a previous VolID stored thereon, the machine passes the VolID and the secret for that volume to the centralized link tracking service. If the centralized link tracking service matches the VolID passed thereto with a VolID stored within the volume table, the volume table will be updated to reflect the machine as the new owner of that volume. Otherwise, the request to enter the VolID into the volume table is denied. If the entry request fails, the machine sending the request may retry the request at a later date, for example, after a week has passed. If this subsequent attempt to enter the VolID fails, the machine preferably requests a new VolID for that volume. As will be appreciated, this has the effect of making any previously established links to files on that volume un-trackable.

When a volume is claimed by being placed on a new machine, a new secret is preferably generated. This prevents the old machine, for example machine A, from reclaiming the volume since it still remembers the old secret. More specifically, to prevent machine A from reclaiming the volume, the new machine, for example machine B, passes both the old secret and the new secret to the DC. The old secret is used for authentication and the new secret is written into the volume table for that VolID at the same time that the VolID's entry is updated with machine B's machine ID. In this manner, since the VolID has a new secret, machine A cannot reclaim it. Thus, the transfer of ownership of the volume from machine A to machine B is discrete and one-way.

To provide still a further measure of security, yet another restriction may be imposed before any link source movement data is stored within the move table. As illustrated in step 76 of FIG. 8, the centralized link tracking service may check to verify the trustworthiness of the machine issuing the link source movement update before the movement data is entered into the move table. Specifically, the centralized link tracking service performs this check by verifying that the VolID in the previous current LSID (revised LSID) is assigned in the volume table to the move-source machine forwarding the information. If this verification is not successful, the centralized link tracking service will refuse to enter the forwarded information into the move table.

As a means for further limiting network communications traffic, for allowing the centralized link tracking service to restore its move table should the information be lost, corrupted or missed (because the DC was offline), and for providing an additional means for finding link source files in a manner to be described hereinafter, the local link tracking services preferably place all link source movement data into a locally maintained queue before it is forwarded to the DC. The queue is preferably a circular queue to minimize the amount of information that is stored on the move-source machines. Furthermore, each volume on a machine preferably maintains its own queue which functions to ensure that only the machine that owns the volume can register move information for that volume in the centralized link tracking service. In this manner, at predetermined time intervals or as a function of the number of queued moves, the move-source machine can package all link source movement updates that occurred since the last update in a single communications packet to the DC.

More specifically, to assist in the restoration of the move table, included with the data uploaded to the DC is a sequence number provided by the local link tracking service on the move-source machine. This sequence number is also maintained in the queues resident on the relevant move-source machine along with the link source movement data that was uploaded with that sequence number. The centralized link tracking service maintains this sequence number on a per-machine basis. More specifically, since the queues are preferably per-volume, the centralized link tracking service also stores its copy of the sequence number in the volume table along with each volumes machine ID and secret.

In this manner, during system initialization or at predetermined fixed time periods, the highest sequence number for each local link tracking service registered with the centralized link tracking service can be compared against the highest sequence number maintained by the local link tracking services. If the local link tracking service has a higher number, it signifies that the move table is not currently up to date. To correct this problem, the local link tracking service can be requested to upload to the DC all the messages necessary to get the move table back up to date. The centralized link tracking service will then process these messages in the same manner described previously. If a circular queue is utilized on the move-source machine, the depth of the queue should be chosen to minimize the chance that information is overwritten between move table update checks. The sequence number may also be checked whenever move notification information is passed to the central server. If the number in the message does not match what the server expects, it returns an error and the expected sequence number. The local link tracking service may then back up its queue and resend all the necessary notifications.

In the course of using the move table update procedures described above, race conditions may result. For example, assume a link source 64 is moved from machine $M_1$ to machine $M_2$ and then to machine $M_3$. Then assume that the move data from machine $M_2$ is received at the centralized link tracking service before the move data from machine $M_1$ is received. When the centralized link tracking service receives the data from machine $M_2$ it will not be valid since the centralized link tracking service expects the link source to be on machine $M_1$ not on machine $M_2$. To correct this problem, the centralized link tracking service holds the message from machine $M_2$ for a predetermined period of time. When the message from machine $M_1$ is received and processed, the message from machine $M_2$ will now be valid. The held message is then processed and the move table updated to reflect the correct status of the link source 64.

For the purpose of further saving storage space within the move table, link sources 64 that are deleted from the network should also have their link map entries removed from the centralized link tracking service database. As it is preferred that only movement data relating to inter-volume link source moves be stored in the move table, a mechanism for informing the local link tracking service that the to-be-deleted link source 64 has an entry within the move table that should likewise be removed is utilized. In the illustrated embodiment, this mechanism involves setting a bit within the link source file when the link source file is moved between volumes, for example, an unused bit in the link source file OID is set from zero to one. In this manner, when the local link tracking service detects the set bit within a link source 64 being deleted, it can send a message to the centralized link tracking service to notify it that the corresponding entry in the move table should also be deleted. This also has the advantage of minimizing network communications traffic as useless information, i.e., information concerning the deletion of a link source 64 that is not mapped within the move table, is prevented from being issued across the network. Preferably, when the centralized link tracking service receives a delete notification, it validates the trustworthiness of the sending machine. For this purpose, the centralized link tracking service takes the birth LSID from the delete notification message and uses the move table to map the birth LSID to the current LSID. It then verifies that the sending machine owns the volume identified in that current LSID.

In another possible means for removing unneeded entries from the move table, the link tracking service may implement a garbage collection procedure. In this procedure, the local link tracking services will periodically notify the centralized link tracking service of all of the link sources it has on each of its volumes. This information may then be compared to the information stored within the move table. For example, supplied birth LSIDs may be compared against birth LSIDs stored within the move table. If the information received has a corresponding entry in the move table (birth LSIDs match) the entry is marked as being current. If an entry is not marked as being current within some given time period, the entry may be deleted from the move table as being out-of-date. Similarly, the VolIDs on a machine may be sent to the. centralized link tracking service for comparison against the VolIDs maintained in the volume table. The entries in the volume table may then be marked and deleted in the same manner as described above with respect to the move table.

Figure 11:
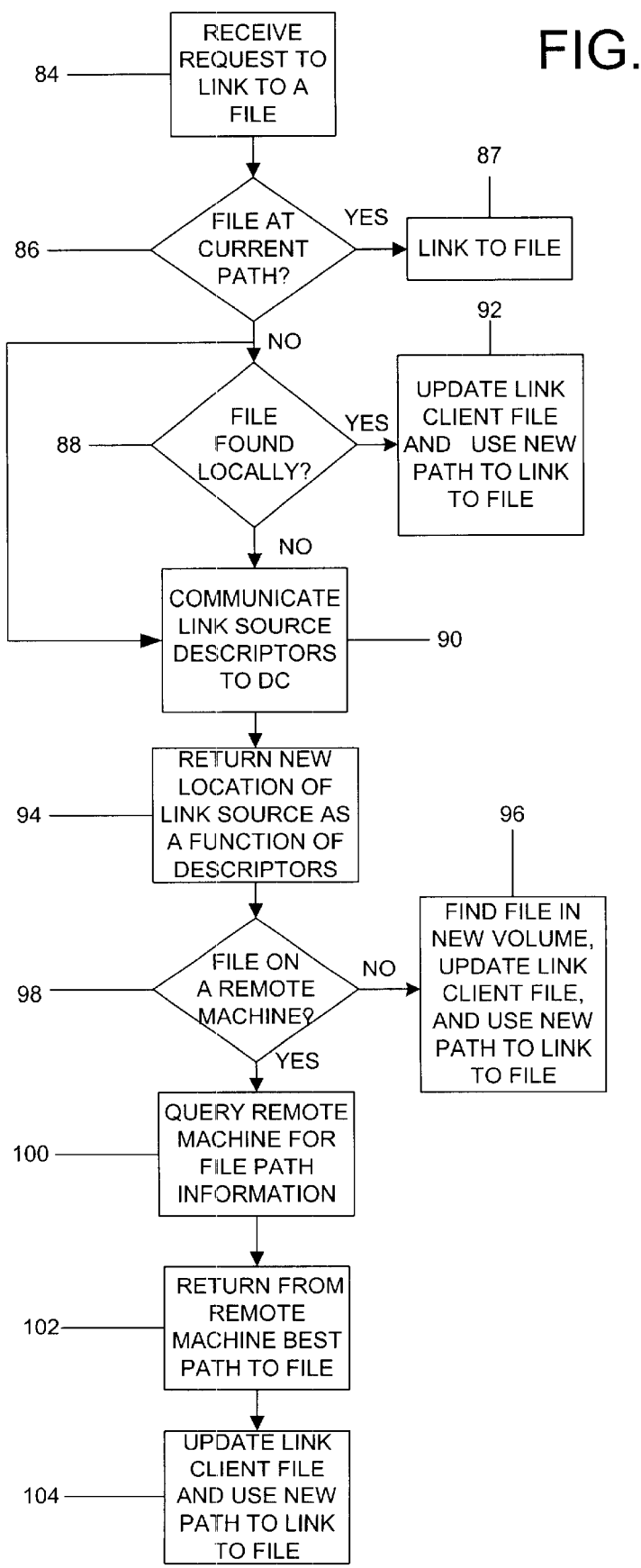
FIG. 11 is a flow chart diagram generally illustrating a method for finding a link source that has been moved and for mending a link client in accordance with the invention.

Turning now to FIG. 11, the means by which a link source 64 is found and by which a link client 60 is mended will be described. When a local link tracking service receives a request in step 84 to link to a file, certain data representative of the link source, the data being contained within the link client 60, is passed to the local link tracking service. The local link tracking service may first attempt to link to the link source file in steps 86 and 87 following a path described within the link client file. Should the link source 64 not reside at this path, i.e., no file resides at the terminus of the path or the file that resides there does not match the characteristics of the expected file, the local link tracking service may attempt in step 88 to find the link source 64 on the last-known machine (the machine on which the link source 64 was last-known to reside) using other data.

To find the link source 64 on the last-known machine, the local link tracking service preferably utilizes the link source descriptors contained within the link client 60. Specifically, the link tracking service employs the last LSID to find the moved link source 64. Even though the link source 64 gets a revised LSID when it is moved to a new volume, if the move is to another volume of the same machine, the last LSID stored within the link client 60 will be similar enough to the revised LSID that the match can be made with a high degree of confidence. If the link source 64 is found, the link client 60 is updated in step 92 to reflect the new LSID and path.

Figure 12:
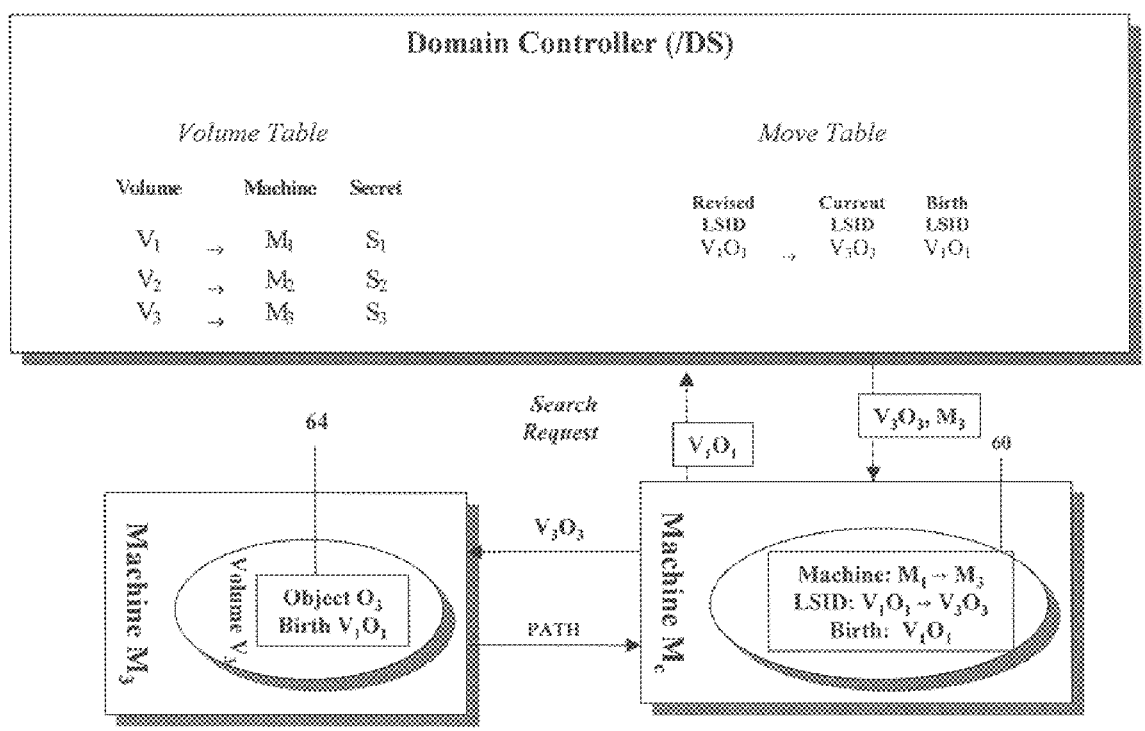
FIG. 12 is a data flow diagram generally illustrating the method for mending a link in accordance with FIG. 11.

If the link source 64 is not found on the last-known machine (or at the terminus of its expected path if the last-known machine searching step is not used), the centralized link tracking service can be invoked to find a link source 64 that has been moved within the same domain. Generally, as additionally illustrated in FIG. 12, the local link tracking service queries the centralized link tracking service to search its move table and volume table for the current location of the link source 64. More specifically, the local link tracking service provides the centralized link tracking service in step 90 with some data representative of the link source, for example, the birth LSID of the link source 64 ($V_1O_1$ as illustrated in FIG. 12). Using this birth LSID, the central link tracking service returns to the local link tracking service in step 94 data representative of the current location of the link source, for example, the current LSID and current machine ID on which the link source 64 is believed to reside ($V_3O_3,M_3$ as illustrated in FIG. 12). The current machine ID is determined using the volume table and the VolID in the current LSID found in the move table. If the link source 64 is locally stored, the local link tracking service uses the returned data to perform a search for the link source on the appropriate volume. When the link source is found, the local link tracking service updates in step 96 the link source path and descriptors within the link client 60.

In still a further implementation, any held move messages, e.g., move messages that have not been entered into the move table because of potential race conditions, could also be searched to find the current location of the link client. In this implementation, the centralized link tracking service could search for the current LSID of the link source using the last-known LSID of the link source. By way of example, using the held message illustration set forth previously with respect to FIG. 9, the centralized link tracking service could be provided with the last-known LSID ($V_2O_2$) to find the correct current LSID ($V_3O_3$) in the held move message from machine $M_2$.

If the link source 64 has been moved to a remote machine, the local link tracking service queries the local link tracking service of the remote machine in step 100 to find the file. To assist the local link tracking service of the remote machine, the remote machine is passed the relevant data returned from the centralized link tracking service, for example, the current LSID. Once the local link tracking service on the remote machine has found the link source 64, the remote machine returns to the link client machine in step 102 the best path to the link source 64, preferably in UNC form. To determine the best path, preference is given to a path that provides the most access (i.e., leads to a file having READ/WRITE access over a file having only READ access), that provides the most coverage (i.e., C: over c:DOCS) and provides the most visibility (i.e., a share name CROOT that is visible over a share name CROOT$ that is hidden). The information returned from the remote machine and the DC are used in step 104 to update the link source path and descriptors maintained in the link client file.

To minimize the time utilized by the DC in processing messages received from the local machines, a priority can be assigned by the local machines to the issued messages. In this manner, the DC can evaluate the priority and, should more important processing activities be pending, notify the issuing machine that the received message will not be processed. The issuing machine may then reissue the message at a later time. Preferably, if a message is rejected by the DC, the issuing machine boosts its priority upon each subsequent retransmission of the message.

The subject invention may also be utilized to find a link source 64 that has been moved between machines within a work group. In accordance with this aspect of the invention, the local link tracking service resident of each machine within the work group maintains move message queues despite the fact that there is not a centralized link tracking service to which data relating to the move may be reported. In this manner, the local link tracking service on the machines within the work group can be directly queried in an attempt to obtain a path to the link source 64 (should the link source 64 be stored on the queried machine) or data representing a new current location of the link source 64 (should a move message queue on the queried machine contain an appropriate entry).

For example, to find a link source 64 that has been moved and which cannot be locally found, the local link tracking service on the link-client machine may query the move message queues on the last-known machine (using the machine ID stored in the link client file) to see if a relevant move message is contained therein, in particular, to see if a message queue contains data representing a move destination for the link source 64. As described previously, this data may be the new current machine ID and the new current LSID of the link source 64. If such a destination is found, an attempt to find the link source 64 on the machine represented by the new current machine ID can be initiated using the new current LSID. In particular, the local link tracking service on the indicated new machine is queried in hopes of obtaining a path to the link source 64 or information indicative of a new current location for the link source 64. If the queried link tracking service responds with a new current location for the link source 64, the procedure can be repeated by querying the local link tracking service on the newly indicated remote machine.

If neither the file nor any relevant information is found as a result of any query, the local link tracking services on the remote machines within the work group can be queried in the manner described using a machine search list or the like. In requesting assistance from remote local link tracking services the most up-to-date descriptors for the link source 64 should be used. As will be appreciated, the procedure described in the preceding paragraphs may also be used to query machines in a wide area network to find link sources 64 that have been moved to machines outside of a domain.

While the described implementation utilizes shell shortcuts for the link client which, along with the IDs stores the path to the link source, it is possible to implement a link client that does not store the path. In such an embodiment, the link tracking service would always be utilized to find the link source. In this embodiment, links may be redirected without actually moving any files (without using the MoveFile API). For example, a MoveFileIdentity API may be provided that would receive the name of a source file and a destination file. If the files are on the same volume, the IDs would simply be set on the destination file and deleted from the source file. If the files are on different volumes, a move notification message would be sent to the DC and the IDs would be deleted from the source.

As will be further appreciated, the link tracking services may also be used to find a link source that has not been moved but whose path has otherwise changed from that which is stored in the link client, for example, if the machine is renamed, the share is changed or the file is renamed. Because the link client still maintains the last LSID and the volume ID in that LSID can be mapped by the centralized link tracking service to the current machine ID on which the volume is located, the machine on which the file is stored is findable. This machine may then be queried in the manner described to find the file. The link client also knows the last machine ID for use in the workgroup case when there is no DC and, therefore, no volume table.

In still a further embodiment, when a link source is moved and it overwrites or replaces another link source, it is desirable for link clients of both the overwritten link source and the overwriting link source to track to the merged file. For this purpose, the merged file maintains the birth LSID of the overwriting file. The move-destination machine then sends a special move notification to the DC. The DC verifies the trustworthiness of the notification and, if verified, writes a special entry to the move table that maps the old birth LSID to the new birth LSID. Thus, when searching for a link source based on information from a link client that was made to the overwritten file, the old birth LSID is mapped to the new birth LSID which is subsequently mapped to the current LSID.

As described, the invention is preferably implemented in connection with the "WINDOWS NT" 5.0 brand operating system. In connection with this operating system, the tracking service exposes its functionality via the ShellLink COM object which implements the IShellLink Interface. Link Clients may be created using the IShellLink::SetPath Path method and link sources may be found using the IShellLink::Resolve method. When the state of a ShellLink object is updated by a create or resolve, it is persisted using the IPersistStream or IPersistFile interface. As these interfaces and methods are described more thoroughly in the "WINDOWS NT 5.0 SDK," they will not be described in greater detail herein for the sake of brevity.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. In a computer network including a plurality of computers, a method for maintaining the integrity of a link between a link client and a link source, the method comprising the steps of:

receiving a command to move the link source from a first location within the network to a second location within the network;

determining if the first location and the second location reside on different volumes; and if the first location and the second location reside on different volumes, storing data representative of the move at a third location within the network accessible to the plurality of computers, the stored data being thereafter available for use in maintaining the integrity of the link between the link client and the link source.

2. The method as recited in claim 1, wherein the data representative of the move comprises data that generally describes the link source at the first location and data that generally describes the link source at the second location.

3. The method as recited in claim 2, wherein the first location comprises a first volume having a first volume ID, the link source stored on the first volume has a first object ID, and the data that generally describes the link source at the first location comprises the first volume ID and the first object ID.

4. The method as recited in claim 3, wherein the second location comprises a second volume having second volume ID, the link source stored on the second volume has a second object ID, and the data that generally describes the link source at the second location comprises the second volume ID and the second object ID.

5. The method as recited in claim 4, wherein the first object ID and the second object ID are the same.

6. The method as recited in claim 4, wherein the data representative of the move further comprises data that generally describes the link source at a birth location within the network.

7. The method as recited in claim 6, wherein the birth location resides on a birth volume having a birth volume ID, the link source stored on the birth volume has a birth object ID, and the data that generally describes the link source at the birth location comprises the birth volume ID and the birth object ID.

8. The method as recited in claim 7, wherein the first volume ID and the birth volume ID are the same and the first object ID and the birth object ID are the same.

9. The method as recited in claim 1, wherein the plurality of computers reside in a domain including a domain controller and wherein the third location comprises a database associated with the domain controller.

10. The method as recited in claim 9, wherein the step of receiving the command to move the link source is received at one of the plurality of computers and the method further comprises the step of communicating the data representative of the move in a communication issued from the one of the plurality of computers to the domain controller.

11. The method as recited in claim 10, wherein the step of communicating the data representative of the move is inhibited if the command to move the link source is received from an untrustworthy agent.

12. The method as recited in claim 11, wherein the untrustworthy agent comprises an agent failing to have write access to the link source.

13. The method as recited in claim 10, wherein the first location resides on a first volume having a first volume ID, the second location resides on a second volume having a second volume ID, the link source stored at the first location has a first object ID, the link source stored at the second location has a second object ID, and the data representative of the move comprises the first volume ID, the second volume ID, the first object ID and the second object ID.

14. The method as recited in claim 13, wherein the first location resides on the one of the plurality of computers and wherein the second location resides on a different one of the plurality of computers.

15. The method as recited in claim 9, wherein the database comprises a move table into which the data representative of the move is stored.

16. The method as recited in claim 15, wherein the first location resides on a first volume having a first volume ID, the second location resides on a second volume having a second volume ID, the link source stored at the first location has a first object ID, the link source stored at the second location has a second object ID, and the data representative of the move comprises the first volume ID, the second volume ID, the first object ID and the second object ID.

17. The method as recited in claim 16, wherein the data representative of the move further comprises data that generally describes the link source at a birth location.

18. The method as recited in claim 17, wherein the birth location resides on a birth volume having a birth volume ID, the link source stored on the birth volume has a birth object ID and the information that generally describes the link source at the birth location comprises the birth volume ID and the birth object ID.

19. The method as recited in claim 10, wherein the step of communicating further comprises the step of assigning a priority to the communication.

20. The method as recited in claim 10, wherein the step of communicating further comprises the step of maintaining a copy of the data representative of the move in a memory queue within the one of the plurality of computers.

21. The method as recited in claim 20, wherein the memory queue is a circular queue.

22. The method as recited in claim 20, wherein the data representative of the move further comprises a sequence number assigned by the one of the plurality of computers.

23. The method as recited in claim 1, wherein the plurality of computers reside in a work group, wherein the step of receiving the command to move is received at one of the plurality of computers and the third location comprises a queue on the one of the plurality of computers.

24. The method as recited in claim 23, wherein the first location resides on a first volume having a first volume ID, the second location resides on a second volume having a second volume ID, the link source stored at the first location has a first object ID, the link source stored at the second location has a second object ID, and the data representative of the move comprises the first volume ID, the second volume ID, the first object ID and the second object ID.

25. The method as recited in claim 24, wherein data representative of the move further comprises data that generally describes the link source at a birth location.

26. The method as recited in claim 25, wherein the birth location resides on a birth volume having a birth volume ID, the link source stored on the birth volume has a birth object ID, and the information that generally describes the link source at the birth location comprises the birth volume ID and the birth object ID.

27. In a computer network domain including a plurality of computers and a domain controller, a method for maintaining the integrity of a link between a link client and a link source, the method comprising the steps of:
   receiving at one of the plurality of computers a command from an agent to move the link source from a first location within the network to a second location within the network;
   determining if the agent is trustworthy; and
   if the agent is trustworthy, communicating from the one of the plurality of computers to the domain controller data representative of the move from the first location to the second location and storing, upon receipt of the communication at the domain controller, the data representative of the move in a database, the stored data being used to maintain the integrity of the link to the link source.

28. The method as recited in claim 27, wherein the first location resides on a first volume having a first volume ID, the second location resides on a second volume different that the first volume having a second volume ID, the link source stored on the first volume has a first object ID, the link source stored on the second volume has a second object ID, and the data representative of the move comprises the first volume ID, the first object ID, the second volume ID and the second object ID.

29. The method as recited in claim 28, wherein the data representative of the move further comprises data that generally describes the link source at a birth location.

30. The method as recited in claim 29, wherein the birth location resides on a birth volume having a birth volume ID, the link source stored on the birth volume has a birth object ID, and the data that generally describes the link source at the birth location comprises the birth volume ID and the birth object ID.

31. The method as recited in claim 27, wherein the step of determining if the agent is trustworthy further comprises checking to see if the agent has write access to the link source.

32. In a computer network domain including a plurality of computers and a domain controller, a method for maintaining the integrity of a link between a link client and a link source, the method comprising the steps of:
   receiving at one of the plurality of computers a command from an agent to move the link source from a first location within the network to a second location within the network;
   issuing from the one of the plurality of computers to the domain controller in response to the command a communication comprising data representing the move from the first location to the second location, the data representing the move further comprising data that generally describes the first location;
   determining, upon receipt of the communication at the domain controller, if the first location resides on the computer issuing the communication; and
   if the first location does not reside on the computer issuing the communication, rejecting the communication.

33. The method as recited in claim 32, wherein the first location resides on a first volume having a first volume ID and wherein the data that generally describes the first location comprises the first volume ID.

34. The method as recited in claim 33, wherein the domain controller includes a database having a volume table in which volume IDs are mapped to the plurality of computers and wherein the step of determining further comprises the step using the volume table to determine if the computer issuing the communication includes the first location.

35. In a computer network comprising a plurality of computers in communication with a domain controller having a database, a method for maintaining the integrity of a link between a link client and a link source, the method comprising the steps of:
   receiving at the domain controller a first message containing data representative of a first move of the link source from a first location within the network to a second location within the network;
   receiving at the domain controller subsequent to the first message a second message containing data representing a second move of the link source from the second location within the network to a third location within the network;
   consolidating the data representative of the first move with the data representative of the second move to form an entry in the database that contains data representing the move of the link source from the first location to the third location, the entry in the database being used to maintain the integrity of the link to the link source.

36. The method as recited in claim 35, wherein the first location resides on a first volume having a first volume ID, the second location resides on a second volume having a second volume ID, the third location resides on a third volume having a third volume ID, the link source stored on the first volume has a first object ID, the link source stored on the second volume has a second object ID, and the link source stored on the third volume has a third object ID, the data representative of the move from the first location to the second location comprises the first volume ID, the second volume ID, the first object ID, and the second object ID and the data representative of the move from the second location to the third location comprises the second volume ID, the third volume ID, the second object ID and the third object ID.

37. The method as recited in claim 36, wherein the entry in the database comprises the first volume ID, the third volume ID, the first object ID and the third object ID.

38. The method as recited in claim 37, wherein the entry in the database further comprises data that generally describes the link source at a birth location.

39. A computer-readable medium having stored thereon data structure, comprising:
   a first data field containing data representative of a move-source location of a link source within a network;

a second data field containing data representative of a move-destination location of the link source within the network; and a third data field containing data representative of a birth location of the link source within the network;

wherein the first data field, second data field and third data field are mappable to one another for the purpose of tracking the movement of the link source.

40. The computer-readable medium as recited in claim 39, wherein the move-source location resides on a first volume having a first volume ID, the link source residing on the first volume has a first object ID, the move-destination location resides on a second volume having a second volume ID, the link source residing on the second volume has a second object ID, the data representative of the move-source location comprises the first volume ID and the first object ID, and the data representative of the move-destination location comprises the second volume ID and the second object ID.

41. The computer-readable medium as recited in claim 40, wherein the birth location resides on a third volume having a third volume ID, the link source residing on the third volume has a third object ID, and the data representative of the birth location comprises the third volume ID and the third object ID.

42. The computer-readable medium as recited in claim 41, wherein the computer-readable medium is a database associated with a domain controller in a network domain.

43. The computer-readable medium as recited in claim 41, wherein the computer-readable medium is a memory queue associated with a computer in a network work group.

44. The computer-readable medium as recited in claim 42, further comprising a fourth data field containing data representative of a machine within the network domain and a fifth data field containing data representative of a volume within the machine wherein the fourth data field and fifth data field are mappable to one another for the purpose of locating the volume within the network domain.

45. The computer-readable medium as recited in claim 44, further comprising a sixth data field containing data representative of a secret associated with the volume within the machine wherein the fifth data field and the sixth data field are mappable to one another for the purpose of verifying the location of the volume within the network domain.

46. The computer-readable medium as recited in claim 45, further comprising a seventh data field containing data representative of a sequence number of a received message, the seventh data field and the fifth data field being mappable to one another for the purpose of allowing the currency of the first, second and third data fields to be checked.

47. A computer readable medium having stored thereon data structure, comprising:

a first data field containing data representative of a last known path to a link source;

a second data field containing data representative of a last machine on which the link source was known to be located;

a third data field containing data representative of the link source at the machine; and a fourth data field containing data representative of the link source when a link was first established with the link source;

wherein the data contained in the first, second, third and fourth data fields are provided to find the link source within a computer network.

48. The computer-readable medium as recited in claim 47, wherein the data representative of the link source at the machine comprises a last volume ID representative of a volume on the machine, and a last object ID representative of the link source stored on the volume on the machine and the data representative of the link source when a link was first established with the link source comprises a birth volume ID representative of a volume on a machine on which the link source was located when the link was first established and an object ID representative of the link source on the volume on the machine on which the link source was located when the link was first established.

49. A method for linking to a link source from a link client in a computer network comprised of a plurality of computers linked to a domain controller having a database on which is stored data representative of movement of the link source; the method comprising the steps of:

receiving at one of the plurality of computers a request to link to the link source;

communicating in a message to the domain controller data from the link client that is representative of the link source at a known location within the network;

retrieving from the database as a function of the data in the message data representative of the link source at a current location within the network;

returning the data representative of the link source at the current location within the network to the one of the plurality of computers; and using the data representative of the link source at the current location within the network to link to the link source at the current location within the network;

wherein the data representative of the link source at the known location within the network comprises a volume ID representative of a first volume on one of the plurality of computers and a first object ID representative of the link source as stored on the first volume and the data representative of the link source at the current location within the network comprises a machine ID representative of one of the plurality of computers within the network, a second volume Id representative of a volume on the one of the plurality of computers having the machine ID and a second object ID representative of the link source as stored on the second volume.

50. The method as recited in claim 49, wherein the known location is the birth location of the link source.

51. The method as recited in claim 50, further comprising the step of updating the link client storing within the link client the data representative of the link source at the current location within the network.

52. The method as recited in claim 51, wherein the step of using the data further comprises the step of finding a path to the link source at the current location within the network and the step of updating the link client further comprises the step of storing within the link client the path.

53. A method for linking to a link source from a link client in a computer network comprised of a plurality of computers linked to a domain controller having a database on which is stored data indicative of movement of the link source; the method comprising the steps of:

receiving at one of the plurality of computers a request to link to the link source;

communicating in a first message to the domain controller data from the link client representative of the link source at a known location within the network;

retrieving from the database as a function of the data in the first message data representative of the link source at a current location within the network;

returning in a second message the data representative of the link source at the current location within the network to the one of the plurality of computers;

determining as a function of the data in the second message if the current location within the network resides on the one of the plurality of computers; and if the current location within the network does not reside on the one of the plurality of computers, requesting, as a function of the data in the second message, another one of the plurality of computers to link to the link source.

54. The method as recited in claim 53, wherein the known location is the birth location of the link source.

55. The method as recited in claim 54, further comprising the step of updating the link client by storing in the link client the data representative of the link source at the current location within the network.

56. The method as recited in claim 55, wherein the step of requesting further comprises the step of finding a path to the link source at the current location within the network and the step of updating the link client further comprises the step of storing within the link client the path.

57. The method as recited in claim 56, wherein the step of finding the path further comprises the step of selecting a path which provides the most access to the link source.

58. The method as recited in claim 56, wherein the step of finding the path further comprises the step of selecting a path which provides the most directory coverage.

59. The method as recited in claim 56, wherein the step of finding the path further comprises the step of selecting a path which provides the most visibility.

60. In a computer network comprised of a plurality of computers in communication with a domain controller having a database, a method for maintaining the integrity of links between a plurality of link clients and associated link sources, the method comprising the steps of:

periodically receiving at each of the plurality of computers commands to move one of the link sources from a move-source location with in the network to a move-destination location within the network;

determining, in response to each command, if the move-source location and the move-destination location within the network reside on different volumes; and if the move-source location and the move-destination location reside on different volumes, performing the further step of forming a message that comprises data representative of the move of the one of the link sources from the move-source location to the move-destination location, assigning a sequence number to the message, maintaining a copy of the message and its associated sequence number on the one of the plurality of computers forming the message, and issuing the message and sequence number to the domain controller whereby the data is stored in the database and the domain controller maintains the sequence number on a per-volume basis.

61. The method as recited in claim 60, comprising the further step of periodically checking on a per-volume basis the highest sequence number maintained on the domain controller against the highest sequence number maintained on each of the plurality of computers and, if the sequence number maintained on the domain controller is lower than the sequence number stored on the computer, causing the computer to reissue to the domain controller the message associated with the highest sequence number and the messages associated with any intervening sequence numbers.

62. The method as recited in claim 60, further comprising the steps of periodically notifying the domain controller of the status of all link sources within the network and, as a function of the notification, deleting from the database all data representative of movement of a link source if the link source is determined to be deleted from the network.

63. The method as recited in claim 61, wherein the step of checking is performed in response to receipt of the message at the domain controller.

64. A computer-readable medium having computer-executable instructions for performing the steps comprising:

receiving a command to move a link source from a first location within a network to a second location within the network;

determining if the first location and second location reside on different volumes; and if the first location and the second location reside on different volumes, forming a message comprising data representative of the first location, the link source as stored at the first location, the second location, and the link source as stored at the second location.

65. The computer-readable medium as recited in claim 64, wherein the data representative of the first location comprises a first volume ID, the data representative of the link source as stored at the first location comprises a first object ID, the data representative of the second location comprises a second volume ID, and the data representative of the link source as stored at the second location comprises a second object ID.

66. The computer-readable medium as recited in claim 65, wherein the message further comprises data generally representing a birth location of the link source, the birth location resides on a birth volume having a birth volume ID, the link source as stored on the birth volume has a birth object ID, and the data generally representing the birth location comprises the birth volume ID and the birth object ID.

67. A computer-readable medium having instructions for performing the steps of:

receiving a request seeking data representing a link source at a current location source within a network, the request including data representing the link source at a known location within the network;

retrieving from a database as a function of the data included within the request the data representing the link source at the current location within the network; and returning to the requestor in a return message the data representing the link source at the current location within the network;

wherein the data representing the link source at the known location within the network comprises a volume ID representative of a first volume in the network and an object ID representative of the link source as stored on the first volume and the data representing the link source at the current location within the network comprises a machine ID representative of a computer within the network, a second volume ID representative of a volume on the computer and a second object ID representative of the link source as stored on the second volume.

68. The computer-readable medium as recited in claim 67, wherein the known location is the birth location of the link source.

69. A method for finding a link source in a computer network comprised of a plurality of computers arranged in a work group, each computer having at least one volume and each volume maintaining a queue in which is storable data representative of movement of the link source, the method comprising the steps of:

receiving at one of the plurality of computers a request to link to the link source;

searching for the link source on the computer receiving the request; and if the link source is not found on the computer receiving the request, performing the further steps of communicating in a search request message to another one of the plurality of computers data from the link client that is representative of the link source at a known location within the network, searching, in response to the receipt of the search request message, the queues on the another computer for data pertaining to the link source and notifying the computer receiving the request of the results of the search on the another computer, and, if the reply indicates that link source has not been found, issuing another search request message to a different one of the plurality of the computers.

70. The method as recited in claim 69, wherein the step of searching for the link source of the computer receiving the request further comprises the step of searching the queues of the computer receiving the request to find an identity of the computer to which to direct the search request message.

71. A method for finding a location of a link source in a network comprised of a plurality of computers linked to a domain controller having a database on which is stored data representative of the location of the link source, the method comprising the steps of:

receiving at one of the plurality of computers a request to link to the link source;

communicating in a message to the domain controller data from the link client that is representative of the link source at a known location within the network;

retrieving from the database as a function of the data in the message data representative of the link source at a current location within the network; and returning the data representative of the link source at the current location within the network to the one of the plurality of computers;

wherein the data representative of the link source at the known location within the network comprises a volume ID representative of a volume on one of the plurality of computers on which the link source was last known to be stored and the data representative of the link source at the current location within the network comprises a machine ID representative of one of the plurality of computers within the network, the machine ID being mapped to the volume ID within the database.

72. In a computer network including a plurality of computers, a method for maintaining the integrity of a link between a link client and a link source, the method comprising the steps of:

receiving a command at one of the computers to delete the link source from the network;

issuing from the computer to a central repository that maintains information relating to the link source a message that functions to notify the central repository that the link source is to be deleted;

determining, upon receipt of the message by the central repository, if the message is deemed trustworthy; and if the message is deemed trustworthy, deleting from the central repository the information relating to the link source.

73. The method as recited in claim 72, wherein the message comprises data representative of the link source at a birth location, the data comprising a birth volume ID and a birth object ID.

74. The method as recited in claim 73, wherein the step of determining if the message is deemed trustworthy further comprises the step of using the birth volume ID to determine if the computer issuing the message has the link source stored thereon.

75. The method as recited in claim 74, wherein the step of using the birth volume ID comprises the further steps of mapping the birth volume ID to a current volume ID that is representative of the last known location of the link source as recognized by the centralized repository and mapping the current volume ID to a machine ID that is representative of the last known computer to own the volume as recognized by the central repository.

76. In a computer network including a plurality of computers linked to a domain controller, a method for maintaining the integrity of a link between a link client and a link source, the method comprising the steps of:

receiving at the domain controller a notification that a volume has been moved to a new computer, the notification comprising data representative of the identity of the volume and data representative of a secret associated with the volume;

using the data representative of the secret to update a volume table maintained at the domain controller, the volume table comprising data that maps volume IDs to machine IDs, the update causing the volume ID to be mapped to a machine ID representative of the machine issuing the notification; and returning the machine ID to one of the plurality of computers in response to a request by the one of the plurality of computers to find a link source that was last known to reside on the volume having the volume ID whereby the one of the plurality of computers can direct further requests to find the link source to a link tracking service resident on the computer identified by the machine ID.

* * * * *

UNITED STATES PATENT AND TRADEMARK OFFICE
CERTIFICATE OF CORRECTION

PATENT NO.     : 6,449,615 B1
DATED          : September 20, 2002
INVENTOR(S)    : Liu et al.

It is certified that error appears in the above-identified patent and that said Letters Patent is hereby corrected as shown below:

<u>Title page,</u>
Item [56], OTHER PUBLICATIONS, "Qulici et al.," reference, "Rerverse" should read -- Reverse --.

<u>Column 13,</u>
Line 34, "(i.e., C: over c:DOCS)" should read -- (i.e., C:\ over c:\DOCS) --.

<u>Column 21,</u>
Line 40, "with in" should read -- within --.

Signed and Sealed this

Twenty-sixth Day of August, 2003

JAMES E. ROGAN
*Director of the United States Patent and Trademark Office*